(12) United States Patent
Meckes et al.

(10) Patent No.: US 7,264,647 B2
(45) Date of Patent: Sep. 4, 2007

(54) DEVICE FOR ENRICHING AIR WITH OXYGEN IN AN AIRCRAFT, AND A METHOD FOR OPERATING THE DEVICE

(75) Inventors: Rüdiger Meckes, Berkenthin (DE); Wolfgang Rittner, Siblin (DE); Herbert Meier, Lübeck (DE)

(73) Assignee: Dräger Aerospace GmbH (DE)

( * ) Notice: Subject to any disclaimer, the term of this patent is extended or adjusted under 35 U.S.C. 154(b) by 343 days.

(21) Appl. No.: 10/850,656

(22) Filed: May 21, 2004

(65) Prior Publication Data

US 2004/0244585 A1    Dec. 9, 2004

(30) Foreign Application Priority Data

May 22, 2003   (DE)   ................ 103 23 137

(51) Int. Cl.
   *B01D 53/047*   (2006.01)
(52) U.S. Cl. ................ 95/8; 95/130; 96/121; 96/399
(58) Field of Classification Search ............. 95/8, 95/11, 23, 96, 105, 130; 96/121, 131, 397, 96/399, 417; 128/204.18, 204.21, 204.22, 128/205.24
   See application file for complete search history.

(56) References Cited

U.S. PATENT DOCUMENTS

| | | | |
|---|---|---|---|
| 4,627,860 A | 12/1986 | Rowland | |
| 4,960,119 A | 10/1990 | Hamlin | |
| 5,163,978 A * | 11/1992 | Leavitt et al. | 95/8 |
| 5,199,423 A | 4/1993 | Harral et al. | |
| 5,858,063 A * | 1/1999 | Cao et al. | 95/11 |
| 5,906,672 A | 5/1999 | Michaels et al. | |
| 6,063,169 A * | 5/2000 | Cramer et al. | 96/112 |
| 6,342,090 B1 * | 1/2002 | Cao | 95/23 |
| 6,997,970 B2 * | 2/2006 | Crome | 95/8 |
| 2004/0060445 A1 * | 4/2004 | Fujimoto | 96/110 |

FOREIGN PATENT DOCUMENTS

| | | |
|---|---|---|
| DE | 690 10 822 T2 | 3/1995 |
| DE | 101 42 946 A1 | 3/2003 |
| EP | 0 321 140 | 6/1989 |
| EP | 0 882 484 | 12/1989 |
| EP | 0 423 496 | 4/1991 |
| EP | 0 537 614 A1 | 4/1993 |
| WO | WO 03/024569 A1 | 3/2003 |
| WO | WO 03/037786 | 5/2003 |

* cited by examiner

Primary Examiner—Frank M. Lawrence
(74) Attorney, Agent, or Firm—McGlew and Tuttle P.C.

(57) ABSTRACT

A device for enriching air with oxygen in an aircraft, and a method for operating the device provides product gas enrichment with oxygen with minimum requirements. An oxygen measurement apparatus analyzing the product gas flow as well as a throughput sensor are provided in combination with a change-over device. A flow connection to an outlet channel is created in a first switch position, and a flow connection to a consumer conduit exists in a second switch position. A device for producing a change-over signal from the first switch position to the second switch position is provided if the determined oxygen output as a product of the product gas flow and the oxygen concentration has reached or exceeded a predefined threshold value.

16 Claims, 1 Drawing Sheet

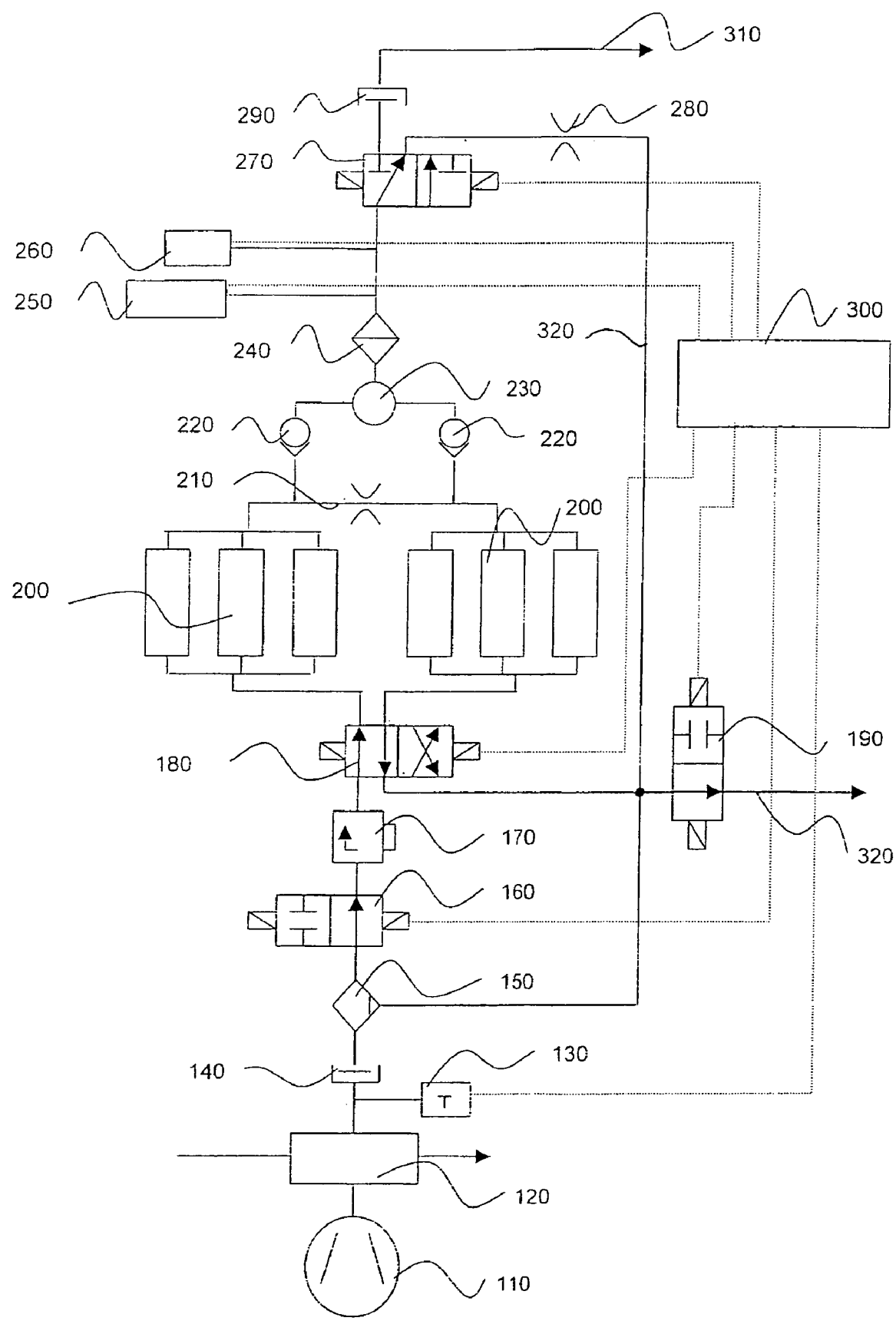

DEVICE FOR ENRICHING AIR WITH OXYGEN IN AN AIRCRAFT, AND A METHOD FOR OPERATING THE DEVICE

CROSS REFERENCE TO RELATED APPLICATIONS

This application claims the benefit of priority under 35 U.S.C. § 119 of DE10323137.4 filed May 22, 2003, the entire contents of which are incorporated herein by reference.

FIELD OF THE INVENTION

The invention relates to a device for enriching air with oxygen in an aircraft, and to a method for operating the device.

BACKGROUND OF THE INVENTION

A device for enriching air with oxygen is known from DE 101 42 946 A1. The hot air which is entrained with water vapour is cooled in a heat exchanger and reaches a water separator with which the condensation product is removed. The product gas enriched with oxygen is produced by way of two, parallel arranged molecular sieve beds which function alternately in an adsorption operation and a desorption operation. For desorption of the molecular sieve bed which is not used, a part of the product gas is used as a rinsing gas flow which flows through the molecular sieve bed located in regeneration operation. A change-over valve which is connected in front of the molecular sieve beds switches between the adsorption and desorption phase.

The known device continuously supplies the produced product gas continuously into the consumer conduit. At the same time it often occurs that after the onset of operation the full output of the molecular sieve bed operating in the adsorption phase is not usually available. The full adsorption output is present if the molecular sieve beds have reached the stationary operating point. During the initial running phase the product gas flow therefore only has an oxygen component which lies below the threshold value required for operation.

SUMMARY OF THE INVENTION

It is the object of the invention to improve a device of the mentioned type to the extent that the product gas achieves minimum requirements. A method for operating the device is also to be specified.

According to the invention, a device for enriching air with oxygen in an aircraft is provided which in series sequence includes a high-pressure source for dispensing air, a water separator, two parallel arranged molecular sieve beds for the alternate adsorption and desorption of nitrogen, a flow transfer means permitting a rinsing gas flow between the molecular sieve beds, an oxygen measurement apparatus analyzing the product gas flow enriched with oxygen, and a change-over device for the product gas flow exiting from the molecular sieve bed. With a first switch position of the change-over device a flow connection to an outlet channel is created. In a second switch position there exists a flow connection to a consumer conduit. Means are provided for producing a change-over signal from the first to the second switch position on exceeding a predefined threshold value for the oxygen concentration.

According to another object of the invention, a method is provided for operating a device for enriching air with oxygen in an aircraft with, in series sequence, a high-pressure source for dispensing air, a water separator, two parallel arranged molecular sieve beds for the alternate adsorption and desorption of nitrogen and a flow transfer means permitting a rinsing gas flow between the molecular sieve beds. The method includes analyzing a product gas flow which exits from the molecular sieve bed, located in the adsorption phase, with an oxygen measurement apparatus and leading away the product gas into an outlet channel during a readiness phase with which the measured oxygen concentration lies below a predefined threshold value for the oxygen concentration. The product gas is supplied to a consumer conduit during an operation phase with which the measured oxygen concentration reaches or exceeds the predefined threshold value.

The advantage of the invention lies essentially in the fact that in dependence on the measured oxygen concentration of the product gas, either a flow connection to an outlet channel is created, so that the product gas may flow away into the surroundings, or with an adequate oxygen component of the product gas, the product gas is supplied to the consumer conduit. For this, the oxygen concentration of the product gas is measured with an oxygen concentration measurement apparatus and in a control and evaluation unit is compared to a threshold value for the oxygen concentration. If the measured oxygen concentration lies below the threshold value, the product is let off without being used. If however the molecular sieve beds have reached the operating temperature and the oxygen concentration has reached or exceeded the threshold value, the product gas is supplied to the consumer conduit by way of the change-over device and may be used for breathing purposes.

The outlet channel in a useful manner is formed as a common flow channel for the product gas flow and the rinsing gas flow. The rinsing gas flow arises during the desorption phase of the molecular sieve bed which is not used. Additionally to the rinsing gas flow, the condensation water separated in the water separator may be supplied to the outlet channel.

In an advantageous manner, alternatively to the oxygen concentration one may also use the oxygen output for the change-over from the readiness phase to the operation phase. The change-over is carried out if the oxygen output which results from the product of oxygen concentration and product gas flow has reached or exceeded a predefined threshold value. A throughput sensor is provided additionally to the oxygen measurement apparatus for detecting the product gas flow.

The method according to the invention is for operating a device for enriching air with oxygen. The device advantageously has in series sequence: a high-pressure source for dispensing air; a water separator; and two parallel arranged molecular sieve beds for the alternate adsorption and desorption of nitrogen and a flow transfer means permitting a rinsing gas flow between the molecular sieve beds. The method is characterised by the steps of: analyzing a product gas flow which exits from the molecular sieve bed located in the adsorption phase, with an oxygen measurement apparatus; leading away the product gas flow into an outlet channel during a readiness phase with which the oxygen concentration lies below a predefined threshold value for the oxygen concentration; and supplying the product gas flow to a consumer conduit during an operation phase with which the oxygen concentration reaches or exceeds the predefined threshold value.

An embodiment example of the invention is shown in the FIGURE and is explained in more detail in the following. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only FIGURE and is a schematic view of the device according to the invention.

DESCRIPTION OF THE PREFERRED EMBODIMENT

The single FIGURE shows a device for enriching air with oxygen, with which in series sequence there are provided a turbine 110 as a high-pressure source for delivering hot turbine air, a heat exchanger 120, a temperature sensor 130, a quick closure coupling 140, a water separator 150 for removing the free water from the turbine air, a shut-off valve 160 for the feed air, a pressure reducer 170, a change-over valve 180 for the alternate filling and emptying of molecular sieve beds 200, a shut-off valve 190 for an outlet channel 320, parallel arranged molecular sieve beds 200, a flow transfer means 210, return valves 220, a product gas collection container 230, a product gas filter 240, a throughput sensor 250, an oxygen sensor 260, a change-over valve 270 for the product gas, a throttle location 280, a quick closure coupling 290, a consumer conduit 310 and a measurement and control unit 300.

The device according to the invention functions in the following manner:

The hot turbine air which is entrained with water vapor, which leaves the turbine 110 is cooled in the heat exchanger 120 to about 30 degrees Celsius. The temperature sensor 130 measures the temperature of the turbine air behind the heat exchanger 120 and transmits this value for further processing to the measurement and control unit 200. A water separator 150 is arranged behind the quick closure coupling 140, in which the condensation product is removed and is led away via the outlet channel 320. The shut-off valves 160 and 190 are only opened on operation of the device, they are closed for the remaining time in order to prevent a penetration of moisture into the molecular sieve beds 200. With the help of the quick closure couplings 140, 290 the device may also be completely separated from the turbine 110 and the consumer conduit 310.

The pressure reducer 170 reduces the pressure to an operating pressure of about 2 to 3 bar. Via the change-over valve, air is supplied to the left molecular sieve beds 200 where nitrogen is adsorbed. The right molecular sieve beds 200 are located in the desorption phase and deliver the previously combined nitrogen to the surroundings. As soon as the adsorption has been completed, the change-over valve 180 is switched over and the right molecular sieve beds 200 are used for the adsorption operation.

The product gas enriched with oxygen gets into the product gas collection container 230 via return valves 220. In order to improve the regeneration of the molecular sieve beds 200, part of the produced product gas is led via the flow transfer means 210 to the molecular sieve beds 200 arranged on the right side, which with the switch position of the change-over valve 180 shown in the figure are located in the desorption phase. The product gas is cleaned in a product gas filter 240 behind the molecular sieve beds 200. Subsequently the product gas flow is measured with the throughput sensor 250 and the oxygen concentration is measured with the oxygen measurement apparatus 260 and transmitted to the measurement and control unit 300.

The change-over valve 270 is activated by the measurement and control unit 300 in a manner such that during a so-called "running warm phase" or "readiness phase" the product gas gets into the outlet channel 320 via a throttle location 280 and flows away into the surroundings. The readiness phase is present as long as the measured oxygen concentration lies below a predefined threshold value for the oxygen concentration. For this, the measured oxygen concentration is constantly compared to the predefined threshold value in the measurement and control means 300. As soon as the threshold value has been reached or exceeded and the corresponding flight altitude has been reached, the change-over valve 270 receives a change-over impulse from the measurement and control unit 300 and the product gas via the consumer conduit 310 gets into the oxygen distribution network of the aircraft not shown in the Figure.

The oxygen output is computed in the measurement and control unit 300 from the product of the oxygen concentration and the product gas flow measured with the throughput sensor 250. Alternatively to the oxygen concentration a threshold value for the oxygen output may be preselected at the measurement and control unit 300 so that the change-over from the readiness phase into the operation phase is effected when the oxygen output has reached or exceeded the threshold value for the oxygen output.

While a specific embodiment of the invention has been shown and described in detail to illustrate the application of the principles of the invention, it will be understood that the invention may be embodied otherwise without departing from such principles.

What is claimed is:

1. A device for enriching air with oxygen in an aircraft, the device comprising in series sequence:
    a high-pressure source for dispensing air;
    a water separator;
    two parallel arranged molecular sieve beds for the alternate adsorption and desorption of nitrogen;
    a flow transfer means for permitting a rinsing gas flow between the molecular sieve beds;
    an oxygen measurement apparatus analyzing the product gas flow enriched with oxygen;
    a throughput sensor for detecting the product gas flow; and
    a change-over device for the product gas flow exiting from the molecular sieve bed, wherein in a first switch position of the change-over device a flow connection to an outlet channel is created for removing product gas flow with an insufficient oxygen output, and in a second switch position there exists a flow connection to a consumer conduit, and wherein there are provided means for producing a change-over signal from the first to the second switch position upon exceeding a predefined threshold value for the oxygen output, said oxygen output being a product of the oxygen concentration and the product gas flow.

2. A device according to claim 1, wherein the outlet channel comprise a throttle location.

3. A device according to claim 1, wherein the outlet channel provides a common flow channel for the product gas flow and the rinsing gas flow.

4. A device according to claim 2, wherein the outlet channel provides a common flow channel for the product gas flow and the rinsing gas flow.

5. A device according to claim 1, wherein the outlet channel is adapted to accommodate the condensation water which is separated by the water separator.

6. A device according to claim 2, wherein the outlet channel is adapted to accommodate the condensation water which is separated by the water separator.

7. A device according to claim 3, wherein the outlet channel is adapted to accommodate the condensation water which is separated by the water separator.

8. A method for operating a device for enriching air with oxygen in an aircraft, the method comprises the steps of:
provided in series sequence a high-pressure source for dispensing air, a water separator, two parallel arranged molecular sieve beds for the alternate adsorption and desorption of nitrogen and a flow transfer means permitting a rinsing gas flow between the molecular sieve beds;
analyzing a product gas flow which exits from the molecular sieve bed located in the adsorption phase, with an oxygen measurement apparatus;
detecting the product gas flow with a throughput sensor;
detecting the oxygen output;
leading away the product gas into an outlet channel during a readiness phase with which the measured oxygen output lies below a predefined threshold value for the oxygen output;
converting from the readiness phase to an operation phase upon exceeding a predefined threshold value for the oxygen output, said oxygen output being formed as a product of the oxygen concentration and the product gas flow; and
supplying the product gas to a consumer conduit during an operation phase with which the measured oxygen output reaches or exceeds the predefined threshold value, said oxygen output being a product of the oxygen concentration and the product gas flow.

9. A method according to claim 8, further comprising providing the outlet channel with a throttle location.

10. A method according to claim 8, further comprising designing the outlet channel as a common flow channel for the product gas flow and the rinsing gas flow.

11. A method according to claim 9, further comprising designing the outlet channel as a common flow channel for the product gas flow and the rinsing gas flow.

12. A method according to claim 8, further comprising leading the condensation water separated in the water separator into the outlet channel.

13. A method according to claim 9, further comprising leading the condensation water separated in the water separator into the outlet channel.

14. A device for enriching air with oxygen in an aircraft, the device comprising:
a high-pressure source for dispensing air;
a water separator;
two parallel arranged molecular sieve beds;
a flow transfer means for permitting a rinsing gas flow between the molecular sieve beds;
an oxygen measurement apparatus for detecting the oxygen output of the product gas flow enriched with oxygen;
a throughput sensor detecting the product gas flow;
a change-over device for product gas flow exiting from the molecular sieve bed, said change-over device switching between an outlet channel flow position for discarding product flow gas with insufficient oxygen output and a consumer conduit flow connection position; and
a control means for controlling said change-over device position whereby said control means compares the oxygen output of the product gas flow to a preset threshold value, said control means sending a change-over signal to switch said change-over device to the consumer conduit flow connection position upon the oxygen output exceeding the predefined threshold value.

15. A device according to claim 14, wherein the outlet channel comprise a throttle location.

16. A device according to claim 14, wherein the outlet channel provides a common flow channel for the product gas flow and the rinsing gas flow.

* * * * *